US012785092B2

(12) United States Patent
Zhang et al.

(10) Patent No.: US 12,785,092 B2
(45) Date of Patent: Nov. 3, 2026

(54) SPINEL-TYPE NICKEL-MANGANESE-LITHIUM-CONTAINING COMPOSITE OXIDE, PREPARATION METHOD THEREOF, AND SECONDARY BATTERY AND ELECTRIC APPARATUS CONTAINING SAME

(71) Applicant: CONTEMPORARY AMPEREX TECHNOLOGY (HONG KONG) LIMITED, Hong Kong (CN)

(72) Inventors: Zhenguo Zhang, Ningde City (CN); Jingpeng Fan, Ningde City (CN); Xingkai Hu, Ningde City (CN); Sihui Wang, Ningde City (CN); Qiang Chen, Ningde City (CN); Na Liu, Ningde City (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 728 days.

(21) Appl. No.: 18/315,511

(22) Filed: May 11, 2023

(65) Prior Publication Data

US 2023/0282821 A1 Sep. 7, 2023

Related U.S. Application Data

(63) Continuation of application No. PCT/CN2021/141143, filed on Dec. 24, 2021.

(51) Int. Cl.

*H01M 4/505* (2010.01)
*C01G 53/54* (2025.01)

(Continued)

(52) U.S. Cl.

CPC ............ *H01M 4/505* (2013.01); *C01G 53/54* (2013.01); *H01M 4/131* (2013.01); *H01M 4/525* (2013.01);

(Continued)

(58) Field of Classification Search

None

See application file for complete search history.

(56) References Cited

U.S. PATENT DOCUMENTS

2011/0017946 A1 1/2011 Choi
2017/0373319 A1* 12/2017 Endo ..................... H01M 4/625

(Continued)

FOREIGN PATENT DOCUMENTS

CN 102569807 A 7/2012
CN 104064729 A 9/2014

(Continued)

OTHER PUBLICATIONS

The extended European Search Report received in the corresponding European Application 21960112.7, mailed on Jan. 4, 2024.

(Continued)

*Primary Examiner* — Scott J. Chmielecki
(74) *Attorney, Agent, or Firm* — K&L Gates LLP

(57) ABSTRACT

A spinel-type nickel-manganese-lithium-containing composite oxide, a preparation method thereof, and a secondary battery and an electric apparatus containing the same are provided. A body material of the spinel-type nickel-manganese-lithium-containing composite oxide is represented by a general formula $Li_xNi_yMn_zM_mO_4Q_q$, and both element P and one or more elements selected from elements Nb, W, and Sb are doped in the body material, where based on mass of the spinel-type nickel-manganese-lithium-containing composite oxide, doping content k of the element P satisfies 0.48 wt %≤k≤3.05 wt %, doping content g of the one or (Continued)

more elements selected from the elements Nb, W, and Sb satisfies 0.05 wt %≤g≤0.31 wt %, and 2≤k/g≤20. The secondary battery provided in this application has good high-temperature storage performance and high-temperature cycling performance.

24 Claims, 3 Drawing Sheets

(51) Int. Cl.

| | |
|---|---|
| ***H01M 4/02*** | (2006.01) |
| ***H01M 4/131*** | (2010.01) |
| ***H01M 4/525*** | (2010.01) |

(52) U.S. Cl.

CPC ...... *C01P 2002/32* (2013.01); *C01P 2002/52* (2013.01); *C01P 2004/01* (2013.01); *C01P 2004/61* (2013.01); *C01P 2004/84* (2013.01); *C01P 2006/10* (2013.01); *C01P 2006/12* (2013.01); *C01P 2006/40* (2013.01); *H01M 2004/021* (2013.01)

(56) References Cited

U.S. PATENT DOCUMENTS

| | | | | |
|---|---|---|---|---|
| 2020/0119341 | A1 | 4/2020 | Baek et al. | |
| 2020/0203706 | A1* | 6/2020 | Holman .............. | H01M 4/0469 |
| 2020/0373555 | A1* | 11/2020 | Yushin .............. | H01M 10/0525 |

FOREIGN PATENT DOCUMENTS

| | | | |
|---|---|---|---|
| CN | 108025927 | A | 5/2018 |
| CN | 108091854 | A | 5/2018 |
| CN | 109817968 | A | 5/2019 |
| CN | 110085858 | A | 8/2019 |
| CN | 111129481 | A | 5/2020 |
| CN | 111453776 | A | 7/2020 |
| CN | 113224288 | A | 8/2021 |
| CN | 113707875 | A | 11/2021 |
| JP | 2014220261 | A | 11/2014 |
| JP | 2015144108 | A | 8/2015 |
| KR | 20130076795 | A | 7/2013 |
| KR | 20170073217 | A | 6/2017 |

OTHER PUBLICATIONS

Li Wei et al: "Electrochemical properties of niobium and phosphate doped spherical Li-rich spinel LiMn2O4 synthesized by ion implantation method", Chinese Chemical Letters, Elsevier, Amsterdam, NL, vol. 28, No. 7, Mar. 29, 2017 (Mar. 29, 2017), pp. 1438-1446, XP085129715.

Li Wei et.al.: "Supporting information to XP085129715 (published together)", Electrochemical properties of niobium and phosphate doped spherical Li-rich spinel LiMn2O4 synthesized by ion implantation method, Mar. 29, 2017 (Mar. 29, 2017), pp. 1-4, XP093113000.

Marincas Alexandru-Horatiu et al: "Enhancing Lithium Manganese Oxide Electrochemical Behavior by Doping and Surface Modifications", Coatings, vol. 11, No. 4, Apr. 15, 2021 (Apr. 15, 2021), p. 456, XP093112803.

Notice of Allowance (with English Machine Translation), mailed Jan. 2, 2026, for corresponding Korean Patent Application Serial No. 10-2023-7011148.

International Search Report received in the corresponding International Application PCT/CN2021/141143, mailed Sep. 21, 2022.

Notice of Reasons for Refusal received in the corresponding Japanese Application 2023-520269, mailed on May 7, 2024.

* cited by examiner

SPINEL-TYPE NICKEL-MANGANESE-LITHIUM-CONTAINING COMPOSITE OXIDE, PREPARATION METHOD THEREOF, AND SECONDARY BATTERY AND ELECTRIC APPARATUS CONTAINING SAME

CROSS REFERENCE TO RELATED APPLICATIONS

The present application is a continuation of International Application PCT/CN2021/141143, filed Dec. 24, 2021 and entitled "SPINEL-TYPE NICKEL-MANGANESE-LITHIUM-CONTAINING COMPOSITE OXIDE, PREPARATION METHOD THEREOF, AND SECONDARY BATTERY AND ELECTRIC APPARATUS CONTAINING SAME", the entire disclosure of which is incorporated herein by reference.

TECHNICAL FIELD

This application relates to the field of battery technologies, and in particular, to a spinel-type nickel-manganese-lithium-containing composite oxide, a preparation method thereof, and a secondary battery and an electric apparatus containing the same.

BACKGROUND

Lithium-ion secondary batteries have dominated the global secondary battery market due to their advantages such as high working voltage, high specific energy, no pollution, and long service life. Especially in recent years, the lithium-ion secondary batteries have been widely used in electric vehicles and other fields. However, a current lithium-ion secondary battery system (for example, a lithium battery system with spinel-structured lithium nickel manganate as a positive electrode active material) has poor long-term stability at a high voltage, and a working voltage of 4.5 V almost becomes an insurmountable bottleneck for current lithium-ion secondary batteries, and especially exacerbates electrical performance at high temperature.

SUMMARY

This application has been made in view of the foregoing issues. This application is intended to provide a spinel-type nickel-manganese-lithium-containing composite oxide with a stable structure and good kinetic performance, a preparation method thereof, and a secondary battery prepared by using the spinel-type nickel-manganese-lithium-containing composite oxide as a positive electrode material. Further, the application is further intended to provide an electric apparatus containing the secondary battery.

To achieve the foregoing objectives, a first aspect of this application provides a spinel-type nickel-manganese-lithium-containing composite oxide, including a body material and element P and one or more elements selected from elements Nb, W, and Sb doped in the body material, where the one or more elements selected from the elements Nb, W, and Sb are denoted as element G in this specification; where the body material is represented by a general formula $Li_xNi_yMn_zM_mO_{4-q}Q_q$, where M is selected from one or more of Ti, Zr, La, Co, Mg, Zn, Al, Mo, V, Cr, and B, Q is selected from one or two of F and Cl, $0.95 \leq x \leq 1.1$, $0.45 \leq y \leq 0.55$, $1.4 \leq z \leq 1.55$, $0 \leq m \leq 0.05$, and $0 \leq q \leq 1$;

based on mass of the spinel-type nickel-manganese-lithium-containing composite oxide, doping content of the element P is denoted as k, 0.48 wt %≤k≤3.05 wt %, doping content of the element G is denoted as g, 0.05 wt %≤g≤0.31 wt %, and the spinel-type nickel-manganese-lithium-containing composite oxide satisfies $2 \leq k/g \leq 20$.

In some embodiments, the doping content k of the element P may be 1.36 wt %≤k≤2.95 wt %.

In some embodiments, the doping content g of the element G may be 0.07 wt %≤g≤0.21 wt %.

In some embodiments, a relationship between the doping content k of the element P and the doping content g of the element G may be $6 \leq k/g \leq 20$.

In some embodiments, doping of the element P and/or the element G may be gradient doping, and the doping content of the element P and the doping content of the element G gradually decrease from a surface of the body material to its inside.

In some embodiments, the spinel-type nickel-manganese-lithium-containing composite oxide may be of quasi-monocrystalline morphology or monocrystalline morphology.

In some embodiments, a specific surface area of the spinel-type nickel-manganese-lithium-containing composite oxide is ≤1 $m^2/g$, and optionally 0.1 $m^2/g$-0.8 $m^2/g$.

In some embodiments, a true density of the spinel-type nickel-manganese-lithium-containing composite oxide is ≥4.45 $g/cm^3$, and optionally 4.5 $g/cm^3$-4.7 $g/cm^3$.

In some embodiments, a median particle size by volume $D_v50$ of the spinel-type nickel-manganese-lithium-containing composite oxide may be 2-15 μm, and optionally 6 μm-15 μm.

In some embodiments, at least part of surface of the spinel-type nickel-manganese-lithium-containing composite oxide further has a coating layer; optionally, the coating layer includes one or more of elements Al, Ti, B, Zr, and Si; optionally, based on the mass of the spinel-type nickel-manganese-lithium-containing composite oxide, content of the one or more of the elements Al, Ti, B, Zr, and Si is 0.05 wt %-2 wt %; and optionally based on the mass of the spinel-type nickel-manganese-lithium-containing composite oxide, a coating amount of the coating layer is 0.1 wt %-5 wt %. Optionally, the coating layer may be oxide or hydroxide that contains one or more elements selected from elements Al, Ti, B, Zr, and Si, composite oxide or hydroxide that contains Li, or the like.

In some embodiments, when the spinel-type nickel-manganese-lithium-containing composite oxide is charged/discharged at 0.05 C-0.2 C in a button half battery, a proportion of a charge capacity at 3.5 V-4.4 V in the first cycle to a charge capacity at 3.5 V-4.95 V in the first cycle is <3%.

A second aspect of this application provides a preparation method of spinel-type nickel-manganese-lithium-containing composite oxide, which may include the following steps:

S1: providing a body material $Li_xNi_yMn_zM_mO_{4-q}Q_q$, where M is selected from one or more of Ti, Zr, La, Co, Mg, Zn, Al, Mo, V, Cr, and B, Q is selected from one or two of F and Cl, $0.95 \leq x \leq 1.1$, $0.45 \leq y \leq 0.55$, $1.4 \leq z \leq 1.55$, $0 \leq m \leq 0.05$, and $0 \leq q \leq 1$;

S2: providing a P source and one or more sources selected from an Nb source, a W source, and an Sb source, where the one or more sources are denoted as a G source, and mixing the sources with the body material in step S1 to obtain a raw material mixture; and S3: performing high-temperature heat treatment on the raw material mixture obtained in step S2 to obtain the spinel-type nickel-manganese-lithium-containing composite oxide;

where based on mass of the spinel-type nickel-manganese-lithium-containing composite oxide, doping content of the element P in the P source is denoted as k, 0.48 wt %≤k≤3.05 wt %, doping content of the element G in the G source is denoted as g, 0.05 wt %≤g≤0.31 wt %, and the spinel-type nickel-manganese-lithium-containing composite oxide satisfies 2≤k/g≤20.

In some embodiments, raw materials of the body material in step S1 may include a lithium source, a nickel source, and a manganese source; and optionally the raw materials of the body material may further include an additive that contains one or more of elements Ti, Zr, La, Co, Mg, Zn, Al, Mo, V, Cr, B, F, and Cl; where the lithium source may be selected from one or more of oxide, hydroxide, carbonate, and nitrate that contain lithium; the nickel source may be selected from one or more of oxide, hydroxide, carbonate, nitrate, and sulfate that contain nickel; the manganese source may be selected from one or more of oxide, hydroxide, carbonate, nitrate, and sulfate that contain manganese; and the additive may be selected from one or more of the following: oxide, hydroxide, ammonium salt, and nitrate that contain one or more of elements Ti, Zr, La, Co, Mg, Zn, Al, Mo, V, Cr, B, F, and Cl.

In some embodiments, in step S2, the P source is selected from one or more of oxide, hydroxide, ammonium salt, and nitrate that contain P, and the G source is selected from one or more of the following: oxide, hydroxide, ammonium salt, and nitrate that contain one or more elements selected from elements Nb, W, and Sb.

In some embodiments, treatment conditions of the high-temperature heat treatment in step S3 are: heating the raw material mixture to 910-1050° C. at a temperature rise rate of 0.5-3° C./min in an air or oxygen atmosphere, and keeping the temperature for 5-30 hours.

In some embodiments, after the performing high-temperature heat treatment on the raw material mixture in step S3, the preparation method further includes the following step:

S4: performing ball milling on the resulting product of the high-temperature heat treatment in step S3.

In some embodiments, the preparation method further includes the following step:

S5: performing annealing treatment on the resulting product of the high-temperature heat treatment in step S3 or performing annealing treatment on the product obtained through ball milling in step S4.

In some embodiments, conditions of the annealing treatment in step S5 are: heating the resulting product of the high-temperature heat treatment in step S3 or the product obtained through ball milling in step S4 to 600-700° C., and keeping the temperature for 5-50 hours.

In some embodiments, the preparation method of spinel-type nickel-manganese-lithium-containing composite oxide according to the second aspect of the present invention may further include a coating treatment step, and a coating material used in the coating treatment step may be selected from one or more of the following: aluminum oxide, titanium oxide, boron oxide, zirconium oxide, silicon dioxide, and lithium-containing composite oxide that contains one or more of aluminum, titanium, boron, zirconium, and silicon.

A third aspect of this application provides a secondary battery, including the spinel-type nickel-manganese-lithium-containing composite oxide according to the first aspect of this application.

A fourth aspect of this application provides an electric apparatus, including the secondary battery according to the third aspect of this application.

Beneficial Effects

The spinel-type nickel-manganese-lithium-containing composite oxide provided in this application that can be used as a positive electrode material of a secondary battery is a spinel-type nickel-manganese-lithium-containing composite oxide doped with both element P and element G, where the element P and the element G are added with specific amounts. This can stabilize a structure of the composite oxide and especially stabilize its surface structure. When the composite oxide is used as a positive electrode material of a battery, performance such as long-term stability of a battery system at high temperature and high voltage, especially storage performance at full charge at high temperature, can be greatly enhanced. Therefore, the secondary battery in this application that contains the spinel-type nickel-manganese-lithium-containing composite oxide provided in this application has good long-term stability at high temperature and high voltage (especially high-temperature storage performance), thereby having longer service life. The electric apparatus of this application includes the secondary battery provided in this application, and therefore has at least the same advantages as the secondary battery.

BRIEF DESCRIPTION OF DRAWINGS

To describe the technical solutions in the embodiments of this application more clearly, the following briefly describes the accompanying drawings required for describing the embodiments of this application. Apparently, the accompanying drawings in the following description show merely some embodiments of this application, and persons of ordinary skill in the art may still derive other drawings from the accompanying drawings without creative efforts.

Figure 1:
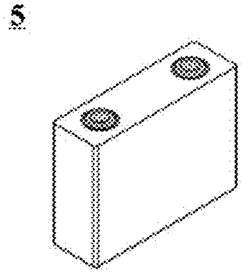
FIG. 1 is a schematic diagram of a secondary battery according to an embodiment of this application.

Reference signs are as follows:

1. battery pack;

2. upper box body;

3. lower box body;

4. battery module; and

5. secondary battery.

DESCRIPTION OF EMBODIMENTS

The following describes in detail embodiments of a spinel-type nickel-manganese-lithium-containing composite oxide, a preparation method thereof, a secondary battery, and an electric apparatus in this application with appropriate reference to the accompanying drawings. However, unnecessary detailed descriptions are omitted. For example, detailed descriptions of well-known items and repeated descriptions of actually identical structures are omitted, to avoid unnecessary redundant descriptions below and facilitate understanding by persons skilled in the art. In addition, the accompanying drawings and the following descriptions are provided to help persons skilled in the art fully understand this application, rather than limiting the subject matter described in the claims.

"Ranges" disclosed in this application are defined in the form of lower and upper limits, given ranges are defined by selecting lower and upper limits, and the selected lower and upper limits define boundaries of special ranges. Ranges defined in the method may or may not include end values, and any combination may be used, that is, any lower limit may be combined with any upper limit to form a range. For example, if ranges of 60 to 120 and 80 to 110 are provided for a specific parameter, it should be understood that ranges of 60 to 110 and 80 to 120 are also expectable. In addition, if minimum values of a range are set to 1 and 2, and maximum values of the range are set to 3, 4, and 5, the following ranges are all expectable: 1 to 3, 1 to 4, 1 to 5, 2 to 3, 2 to 4, and 2 to 5. In this application, unless otherwise specified, a value range of "a to b" represents an abbreviated representation of any combination of real numbers between a and b, where both a and b are real numbers. For example, a value range of "0 to 5" means that all real numbers from "0 to 5" are listed herein, and "0-5" is just an abbreviated representation of a combination of these values. In addition, when a parameter is expressed as an integer greater than or equal to 2, this is equivalent to disclosure that the parameter is, for example, an integer: 2, 3, 4, 5, 6, 7, 8, 9, 10, 11, or 12.

Unless otherwise specified, all the embodiments and optional embodiments of this application can be mutually combined to form a new technical solution.

Unless otherwise specified, all the technical features and optional technical features of this application can be mutually combined to form a new technical solution.

Unless otherwise specified, all the steps in this application may be performed sequentially or randomly, and preferably, are performed sequentially. For example, a method including steps (a) and (b) indicates that the method may include steps (a) and (b) performed in sequence, or may include steps (b) and (a) performed in sequence. For example, that the method may further include step (c) indicates that step (c) may be added to the method in any order. For example, the method may include steps (a), (b), and (c), steps (a), (c), and (b), steps (c), (a), and (b), or the like.

Unless otherwise specified, "include" and "contain" mentioned in this application are inclusive or may be exclusive. For example, "include" and "contain" may mean that other unlisted components may also be included or contained, or only listed components may be included or contained.

Unless otherwise specified, in this application, the term "or" is inclusive. For example, a phrase "A or B" means "A, B, or both A and B". More specifically, any one of the following conditions satisfies the condition "A or B": A is true (or present) and B is false (or not present); A is false (or not present) and B is true (or present); or both A and B are true (or present).

In the descriptions of this specification, it should be noted that "more than" or "less than" is inclusive of the present number and that "more" in "one or more" means two or more than two, unless otherwise specified.

[Secondary Battery]

The secondary battery has become a preferred power supply of an electric apparatus due to its advantages such as high energy density, portability, zero memory effect, and environmental friendliness. However, for a secondary battery with spinel-structured lithium nickel manganate (LNMO) as a positive electrode material, after the secondary battery is charged to a high voltage, a large quantity of side reactions occur on a surface of the positive electrode material due to the high voltage and catalysis of transition metals Ni and Mn, resulting in oxygen loss, generation of $H^+$, and dissolution of transition metal (mainly Mn) ions. $H^+$ is diffused to a negative electrode and then reduced to generate $H_2$, and $Mn^{2+}$ is diffused to the negative electrode to deposit. This reduces conductivity of $Li^+$ on an SEI film of the negative electrode, resulting in a risk of swelling of the battery during storage and cycling, fast capacity loss, and poor long-term stability at high temperature and high voltage, and shortening service life of the secondary battery. Therefore, how to improve long-term stability of a secondary battery with LNMO as a positive electrode material at high temperature and high voltage (specially storage performance at full charge at high temperature) has become a focus in the field of secondary battery technologies.

This application provides a secondary battery. The secondary battery has good long-term stability at high temperature and high voltage, especially storage performance at full charge at high temperature.

Generally, the secondary battery includes a positive electrode plate, a negative electrode plate, an electrolyte, and a separator. During charging and discharging of the battery, active ions are intercalated and deintercalated between the positive electrode plate and the negative electrode plate. The electrolyte conducts ions between the positive electrode plate and the negative electrode plate. The separator is disposed between the positive electrode plate and the negative electrode plate to mainly prevent a short circuit between positive and negative electrodes and to allow the ions to pass through.

[Positive Electrode Plate]

The positive electrode plate includes a positive electrode current collector and a positive electrode membrane that is disposed on at least one surface of the positive electrode current collector and that includes a positive electrode active material. In an example, the positive electrode current collector includes two back-to-back surfaces in a thickness direction of the positive electrode current collector, and a positive electrode membrane layer is disposed on either or both of the two back-to-back surfaces of the positive electrode current collector.

A material with good conductivity and mechanical strength may be used as the positive electrode current collector. In some embodiments, the positive electrode current collector may be an aluminum foil.

In the secondary battery provided in this application, the positive electrode active material on the positive electrode plate contains the spinel-type nickel-manganese-lithium-containing composite oxide provided in this application. The spinel-structured lithium nickel manganate composite oxide material has good structural stability, especially surface structural stability. When the material is used as an active material on a positive electrode plate of a secondary battery, battery system performance of the secondary battery at high temperature and high voltage can be greatly enhanced. For example, swelling is alleviated, and capacity loss is slowed down. This achieves long-term stability at high temperature and high voltage, especially storage performance at full charge at high temperature, thereby significantly prolonging service life of the secondary battery and improving safety performance thereof. The following describes in detail the spinel-type nickel-manganese-lithium-containing composite oxide and the preparation method thereof provided in this application.

Spinel-Type Nickel-Manganese-Lithium-Containing Composite Oxide

The spinel-type nickel-manganese-lithium-containing composite oxide provided in this application includes a body material and element phosphorus (P) and element G that are doped in the body material.

The body material is represented by a general formula $Li_xNi_yMn_zM_mO_{4-q}Q_q$, where M may be selected from one or more of Ti, Zr, La, Co, Mg, Zn, Al, Mo, V, Cr, and B, Q may be selected from one or two of F and Cl, $0.95 \leq x \leq 1.1$, $0.45 \leq y \leq 0.55$, $1.4 \leq z \leq 1.55$, $0 \leq m \leq 0.05$, and $0 \leq q \leq 1$.

Based on mass of the spinel-type nickel-manganese-lithium-containing composite oxide, doping content of the element P is denoted as k, 0.48 wt %≤k≤3.05 wt %, doping content of the element G is denoted as g, 0.05 wt %≤g≤0.31 wt %, and the spinel-type nickel-manganese-lithium-containing composite oxide satisfies 2≤k/g≤20.

The inventors have found through a lot of research that when the spinel-structured lithium nickel manganate composite oxide is doped with both element phosphorus (P) and element G, and satisfies: based on mass of the spinel-type nickel-manganese-lithium-containing composite oxide, doping content k of the element P satisfies 0.48 wt %≤k≤3.05 wt %, doping content g of the element G satisfies 0.05 wt %≤g≤0.31 wt %, and 2≤k/g≤20, the spinel-structured lithium nickel manganate composite oxide material can have good structural stability, especially surface structural stability. When the material is used as a positive electrode material to prepare a secondary battery, battery system performance of the secondary battery at high temperature and high voltage can be greatly enhanced. For example, swelling is alleviated, and capacity loss is slowed down. This achieves long-term stability at high temperature and high voltage, especially storage performance at full charge at high temperature, thereby significantly prolonging service life of the secondary battery and an electric apparatus containing the secondary battery and improving safety performance thereof.

In some embodiments, the doping content k of the element P may be 1.36 wt %≤k≤2.95 wt %.

In some embodiments, the doping content g of the element G may be 0.07 wt %≤g≤0.21 wt %.

In some embodiments, a relationship between the doping content k of the element P and the doping content g of the element G may be 6≤k/g≤20.

In some embodiments, doping of the element P and/or the element G may be gradient doping, and the doping content of the element P and the doping content of the element G gradually decrease from a surface of the body material to its inside. The manner of gradient doping of element P and element G is more conducive to surface stability of the spinel-type nickel-manganese-lithium-containing composite oxide material.

In some embodiments, the spinel-type nickel-manganese-lithium-containing composite oxide may be of quasi-monocrystalline morphology or monocrystalline morphology. Compared with a spinel-type nickel-manganese-lithium-containing composite oxide of polycrystalline morphology, during coating of the spinel-type nickel-manganese-lithium-containing composite oxide of the monocrystalline morphology or quasi-monocrystalline morphology, it is easier to implement overall coating, and a possibility of crystal crushing during subsequent preparation of electrode plates and cycling of a battery is reduced, thereby further improving performance of the battery such as long-term stability and safety during cycling, storage, and the like.

In some embodiments, a specific surface area of the spinel-type nickel-manganese-lithium-containing composite oxide is ≤1 $m^2/g$, and optionally 0.1 $m^2/g$-0.8 $m^2/g$. A small specific surface area can reduce side reactions on a surface, and is more conducive to long-term cycling stability of a secondary battery prepared by using the spinel-type nickel-manganese-lithium-containing composite oxide as a positive electrode material.

In some embodiments, a true density of the spinel-type nickel-manganese-lithium-containing composite oxide is ≥4.45 $g/cm^3$, and optionally 4.5 $g/cm^3$-4.7 $g/cm^3$. Powder particles of the spinel-type nickel-manganese-lithium-containing composite oxide material are dense, which helps improve pressure resistance of the material and reduce a possibility of particle crushing in the electrode plates, thereby further improving overall stability of the battery system.

In some embodiments, a median particle size by volume $D_v50$ of the spinel-type nickel-manganese-lithium-containing composite oxide may be 2-15 μm, and optionally 3.9 μm-14.1 μm.

In some embodiments, at least part of surface of the spinel-type nickel-manganese-lithium-containing composite oxide further has a coating layer; optionally, the coating layer includes one or more of elements Al, Ti, B, Zr, and Si; and optionally based on the mass of the spinel-type nickel-manganese-lithium-containing composite oxide, content of the one or more of the elements Al, Ti, B, Zr, and Si is 0.05 wt %-2 wt %, and optionally 0.3 wt %-1 wt %, for example, 0.05 wt %, 0.1 wt %, 0.2 wt %, 0.5 wt %, 1.5 wt %, or 2 wt %.

In some embodiments, based on the mass of the spinel-type nickel-manganese-lithium-containing composite oxide, a coating amount of the coating layer is 0.1 wt %-5 wt %, and optionally 0.6 wt %-3 wt %, for example, 0.1 wt %, 0.2 wt %, 0.5 wt %, 1 wt %, 1.5 wt %, 2 wt %, 3.5 wt %, 4.5 wt %, or 5 wt %. Optionally, the coating layer may be oxide or hydroxide that contains one or more elements selected from elements Al, Ti, B, Zr, and Si, composite oxide or hydroxide that contains Li, or the like. The coating layer containing the one or more elements selected from the elements Al, Ti, B, Zr, and Si can further improve kinetic performance of the spinel-type nickel-manganese-lithium-containing composite oxide material, thereby improving rate performance of the battery. In addition, the coating layer can physically separate an electrolyte from the positive electrode material, and also be used as a consumable material (which consumes itself to maintain the body material), thereby further improving overall performance of the spinel-type nickel-manganese-lithium-containing composite oxide material.

In some embodiments, when the spinel-type nickel-manganese-lithium-containing composite oxide is charged/discharged at 0.05 C-0.2 C in a button half battery, a proportion of a charge capacity at 3.5 V-4.4 V in the first cycle to a charge capacity at 3.5 V-4.95 V in the first cycle is <3%. The inventors have found that a lower proportion of a charge capacity of the positive electrode active material at a 3.5 V-4.4 V plateau indicates higher content of $P4_332$ and lower content of $Mn^{3+}$ in the positive electrode active material, which is more conducive to long-term stability of the battery at high temperature and high voltage.

Preparation Method of Spinel-Type Nickel-Manganese-Lithium-Containing Composite Oxide The preparation method of spinel-type nickel-manganese-lithium-containing composite oxide provided in this application may include the following steps.

S1: Provide a body material $Li_xNi_yMn_zM_mO_{4-q}Q_q$, where M is selected from one or more of Ti, Zr, La, Co, Mg, Zn, Al, Mo, V, Cr, and B, Q is selected from one or two of F and Cl, $0.95 \le x \le 1.1$, $0.45 \le y \le 0.55$, $1.4 \le z \le 1.55$, $0 \le m \le 0.05$, and $0 \le q \le 1$.

S2: Provide a P source and one or more sources selected from an Nb source, a W source, and an Sb source, where the one or more sources are denoted as a G source, and mix the sources with the body material in step S1 to obtain a raw material mixture.

S3: Perform high-temperature heat treatment on the raw material mixture obtained in step S2 to obtain the spinel-type nickel-manganese-lithium-containing composite oxide.

Based on mass of the spinel-type nickel-manganese-lithium-containing composite oxide, doping content of the element P in the P source is denoted as k, 0.48 wt %≤k≤3.05 wt %, doping content of the element G in the G source is denoted as g, 0.05 wt %≤g≤0.31 wt %, and the spinel-type nickel-manganese-lithium-containing composite oxide satisfies 2≤k/g≤20.

In some embodiments, raw materials of the body material in step S1 may include a lithium source, a nickel source, and a manganese source; and optionally the raw materials of the body material may further include an additive that contains one or more of elements Ti, Zr, La, Co, Mg, Zn, Al, Mo, V, Cr, B, F, and Cl.

In some embodiments, the lithium source may be selected from one or more of oxide, hydroxide, carbonate, and nitrate that contain lithium.

In some embodiments, the nickel source may be selected from one or more of oxide, hydroxide, carbonate, nitrate, and sulfate that contain nickel.

The manganese source may be selected from one or more of oxide, hydroxide, carbonate, nitrate, and sulfate that contain manganese.

In some embodiments, the additive may be selected from one or more of the following: oxide, hydroxide, ammonium salt, and nitrate that contain one or more of elements Ti, Zr, La, Co, Mg, Zn, Al, Mo, V, Cr, B, F, and Cl.

In some embodiments, the P source in step S2 may be selected from one or more of oxide, hydroxide, ammonium salt, and nitrate that contain P.

In some embodiments, the G source in step S2 may be selected from one or more of the following: oxide, hydroxide, ammonium salt, and nitrate that contain one or more elements selected from elements Nb, W, and Sb.

In some embodiments, treatment conditions of the high-temperature heat treatment in step S3 may be: heating the raw material mixture to 910-1050° C. at a temperature rise rate of 0.5-3° C./min in an air or oxygen atmosphere, and keeping the temperature for 5-30 hours.

In some embodiments, after the performing high-temperature heat treatment on the raw material mixture in step S3, the preparation method further optionally includes one or more of the following steps S4 and S5.

S4: Perform ball milling on the resulting product of the high-temperature heat treatment in step S3.

In some embodiments, in step S4, ball milling (for example, a ball mill is used for performing common ball milling for less than 6 h) is performed on the resulting product of the high-temperature heat treatment in step S3. This can break weak agglomeration during the high-temperature heat treatment in step S3 and improve dispersibility of crystals. This operation is different from a common crushing operation (for example, roll crushing and jet milling), a high-energy ball milling operation, or long-time grinding (with treatment time greater than 10 h). The crushing operation, high-energy ball milling operation, or long-time grinding can break hard agglomeration and improve mono-crystallinity (that is, there are fewer crystals in powder particles), but severely damages surfaces of the crystals and produces micro powder. The micro powder greatly affects performance and safety of the battery, and needs to be removed. Tests have shown that in step S4, performing common ball milling on the resulting product of the high-temperature heat treatment in step S3 can keep the crystals as intact as possible and obtain a spinel-type nickel-manganese-lithium-containing composite oxide material with a large size (a median particle size by volume $D_v50$ of the particles=2-15 μm) and monocrystalline morphology or quasi-monocrystalline morphology, thereby further improving surface stability of the material.

S5: Perform annealing treatment on the resulting product of the high-temperature heat treatment in step S3 or perform annealing treatment on the product obtained through ball milling in step S4.

In some embodiments, conditions of the annealing treatment in step S5 may be: heating the resulting product of the high-temperature heat treatment in step S3 or the product obtained through ball milling in step S4 to 600-700° C., and keeping the temperature for 5-50 hours. In this step, appropriate annealing treatment temperature and sufficient temperature hold time can facilitate transition of the material to ordered phase $P4_332$, reduce oxygen defects caused by the high-temperature heat treatment in step S3, and reduce content of bulk phase $Mn^{3+}$. Because the bulk phase $Mn^{3+}$ is one of main sources of dissolution of Mn, Mn can be less dissolved by performing step S5, thereby further significantly improving long-term stability of the obtained spinel-type nickel-manganese-lithium-containing composite oxide material at high temperature and high voltage.

In some embodiments, the preparation method of spinel-type nickel-manganese-lithium-containing composite oxide provided in the present invention may further include a coating treatment step, for example, performing coating treatment on the product obtained in any one of steps S3, S4, and S5 to obtain a spinel-type nickel-manganese-lithium-containing composite oxide with at least a part of a surface of a material being coated.

Coating treatment temperature and temperature hold time may be not limited, provided that the objectives of the present invention can be achieved. For example, the coating treatment temperature may be less than or equal to the annealing temperature in step S5, and the temperature hold time of the coating treatment may be 5-20 h.

In some embodiments, a coating material used in the coating treatment may be selected from one or more of the following: aluminum oxide, titanium oxide, boron oxide, zirconium oxide, silicon dioxide, and lithium-containing composite oxide that contains one or more of aluminum, titanium, boron, zirconium, and silicon.

Through the coating treatment step, the coating material used for the coating can further improve kinetic performance of the obtained spinel-type nickel-manganese-lithium-containing composite oxide material, thereby improving rate performance. The coating material such as aluminum oxide and boron oxide can physically separate an electrolyte from a positive electrode material and also be used as a consumable (consume itself and trap $F^-$ to protect the body material), thereby further improving overall performance of the material.

In some embodiments, the secondary battery provided in the present invention may be a lithium-ion secondary battery. In addition to the spinel-type nickel-manganese-lithium-containing composite oxide material provided in the present invention, the positive electrode active material may further include other well-known positive electrode active materials used for a battery in the art. For example, the other positive electrode active materials may further include at least one of the following materials: olivine-structured lithium-containing phosphate, lithium transition metal oxide, and respective modified compounds thereof. However, this application is not limited to these materials, and other conventional materials that can be used as the positive electrode active material of the battery may also be used. An example of the lithium transition metal oxide may include but is not limited to at least one of lithium cobalt oxide (for example, $LiCoO_2$), lithium nickel oxide (for example, $LiNiO_2$), lithium manganese oxide (for example, $LiMnO_2$ and $LiMn_2O_4$), lithium nickel cobalt oxide, lithium manganese cobalt oxide, lithium nickel manganese oxide, lithium nickel cobalt manganese oxide (for example, $LiNi_{1/3}Co_{1/3}Mn_{1/3}O_2$ ($NCM_{333}$ for short), $LiNi_{0.5}Co_{0.2}Mn_{0.3}O_2$ ($NCM_{523}$ for short), $LiNi_{0.5}Co_{0.25}Mn_{0.25}O_2$ ($NCM_{211}$ for short), $LiNi_{0.6}Co_{0.2}Mn_{0.2}O_2$ ($NCM_{622}$ for short), and $LiNi_{0.8}Co_{0.1}Mn_{0.1}O_2$ ($NCM_{811}$ for short)), lithium nickel cobalt aluminum oxide (for example, $LiNi_{0.85}Co_{0.15}Al_{0.05}O_2$), and modified compounds thereof. An example of the olivine-structured lithium-containing phosphate may include but is not limited to at least one of lithium iron phosphate (for example, $LiFePO_4$ (LFP for short)), a composite material of lithium iron phosphate and carbon, lithium manganese phosphate (for example, $LiMnPO_4$), a composite material of lithium manganese phosphate and carbon, lithium manganese iron phosphate, and a composite material of lithium manganese iron phosphate and carbon.

In some embodiments, the positive electrode membrane further optionally includes a binder. The binder is not limited to any specific type, and may be selected by persons skilled in the art based on actual needs. In an example, the binder for the positive electrode membrane may include one or more of polyvinylidene fluoride (PVDF) and polytetrafluoroethylene (PTFE).

In some embodiments, the positive electrode membrane further optionally includes a conductive agent. The conductive agent is not limited to any specific type, and may be selected by persons skilled in the art based on actual needs. In an example, the conductive agent for the positive electrode membrane may include one or more of graphite, superconducting carbon, acetylene black, carbon black. Ketjen black, carbon dots, carbon nanotubes, graphene, and carbon nanofibers.

In some embodiments, steps of preparing the positive electrode plate by using the positive electrode active material may include: dispersing the positive electrode active material, the binder, and the optional conductive agent in a solvent which may be N-methylpyrrolidone, and uniformly stirring the mixture by using a vacuum stirrer to obtain a positive electrode slurry; and uniformly applying the positive electrode slurry onto a positive electrode current collector aluminum foil, drying the foil at room temperature, and then transferring the foil to an oven for drying, followed by cold pressing and slitting, to obtain the positive electrode plate.

[Negative Electrode Plate]

The negative electrode plate includes a negative electrode current collector and a negative electrode membrane disposed on at least one surface of the negative electrode current collector. In an example, the negative electrode current collector includes two back-to-back surfaces in a thickness direction of the negative electrode current collector, and a negative electrode membrane layer is disposed on either or both of the two back-to-back surfaces of the negative electrode current collector.

A material with good conductivity and mechanical strength may be used as the negative electrode current collector, and the negative electrode current collector can conduct electricity and collect a current. In some embodiments, the negative electrode current collector may be a copper foil.

The negative electrode membrane includes a negative electrode active material, and steps of preparing the negative electrode plate by using the negative electrode active material may include: dispersing the negative electrode active material, a binder, and an optional thickener and conductive agent in a solvent which may be deionized water to form a uniform negative electrode slurry; and applying the negative electrode slurry onto the negative electrode current collector, followed by processes such as drying and cold pressing, to obtain the negative electrode plate.

In some embodiments, the negative electrode active material is not limited to a specific type in this application, and the negative electrode plate optionally includes a negative electrode active material that can be used for a negative electrode of a secondary battery. The negative electrode active material may be one or more of graphite material (for example, artificial graphite and natural graphite), mesocarbon microbeads (MCMB for short), hard carbon, soft carbon, silicon-based material, and tin-based material.

In some embodiments, the binder may be selected from one or more of polyacrylic acid (PAA), polyacrylic acid sodium (PARS), polyacrylamide (PAM), polyvinyl alcohol (PVA), styrene butadiene rubber (SBR), sodium alginate (SA), polymethacrylic acid (PMAA), and carboxymethyl chitosan (CMCS).

In some embodiments, the thickener may be sodium carboxymethyl cellulose (CMC-Na).

In some embodiments, the conductive agent for the negative electrode plate may be selected from one or more of graphite, superconducting carbon, acetylene black, carbon black, Ketjen black, carbon dots, carbon nanotubes, graphene, and carbon nanofibers.

[Electrolyte]

The electrolyte conducts ions between the positive electrode plate and the negative electrode plate. The electrolyte is not limited to any specific type in this application, and may be selected based on a need. For example, the electrolyte may be in a liquid state, a gel state, or an all-solid state.

In some embodiments, the electrolyte is a liquid electrolyte. The liquid electrolyte includes an electrolytic salt and a solvent.

In some embodiments, the electrolytic salt may be selected from one or more of $LiPF_6$ (lithium hexafluorophosphate), $LiBF_4$ (lithium tetrafluoroborate), $LiClO_4$ (lithium perchlorate), $LiAsF_6$ (lithium hexafluoroarsenate), LiFSI (lithium bis(fluorosulfonyl)imide), LiTFSI (lithium bistrifluoromethanesulfonimide), LiTFS (lithium trifluoromethanesulfonate), LiDFOB (lithium difluorooxalatoborate), LiBOB (lithium bisoxalatoborate), $LiPO_2F_2$ (lithium difluorophosphate), LiDFOP (lithium bisoxalatodifluorophosphate), and LiTFOP (lithium tetrafluorooxalatophosphate).

In some embodiments, the solvent may be selected from one or more of ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethyl propyl carbonate (EPC), butylene carbonate (BC), fluoroethylene carbonate (FEC), methyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), sulfolane (SF), methyl sulfonyl methane (MSM), methyl ethyl sulfone (EMS), and diethyl sulfone (ESE).

In some embodiments, the liquid electrolyte further optionally includes an additive. For example, the additive may include a negative electrode film-forming additive, or may include a positive electrode film-forming additive, or may include an additive capable of improving some performance of the battery, for example, an additive for improving overcharge performance of the battery, an additive for improving high-temperature performance of the battery, or an additive for improving low-temperature performance of the battery.

[Separator]

Secondary batteries using a liquid electrolyte and some secondary batteries using a solid electrolyte further include a separator. The separator is disposed between the positive electrode plate and the negative electrode plate for separation. The separator is not limited to any specific type in this application, and may be any well-known porous separator with good chemical stability and mechanical stability. In some embodiments, a material of the separator may be selected from one or more of glass fiber, non-woven fabric, polyethylene, polypropylene, and polyvinylidene fluoride. The separator may be a single-layer thin film or a multi-layer composite thin film. When the separator is a multi-layer composite thin film, all layers may be made of the same or different materials.

[Outer Package]

In some embodiments, the secondary battery may include an outer package for packaging the positive electrode plate, the negative electrode plate, and the electrolyte. In an example, the positive electrode plate, the negative electrode plate, and the separator may be laminated or wound to form a cell of a laminated or wound structure, and the cell is packaged in the outer package; and the electrolyte may be the liquid electrolyte, and the liquid electrolyte infiltrates into the cell. There may be one or more cells in the secondary battery, and the quantity may be adjusted based on a need.

In some embodiments, the outer package of the secondary battery may be a soft pack, for example, a soft pouch. A material of the soft pack may be plastic, for example, may include one or more of polypropylene PP, polybutylene terephthalate PBT, polybutylene succinate PBS, and the like. The outer package of the secondary battery may alternatively be a hard shell, for example, an aluminum shell.

In some embodiments, the positive electrode plate, the negative electrode plate, and the separator may be made into an electrode assembly through winding or lamination.

The secondary battery is not limited to any specific shape in this application, and the secondary battery may be cylindrical, rectangular, or of any other shape. FIG. 1 is a secondary battery 5 of a rectangular structure as an example.

The secondary batteries provided in the present invention may be assembled into a battery module, and the battery module may include a plurality of secondary batteries. A specific quantity may be adjusted based on use and capacity of the battery module.

Figure 2:
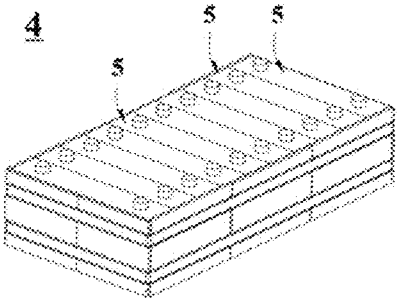
FIG. 2 is a schematic diagram of a battery module according to an embodiment of this application.

FIG. 2 is a battery module 4 as an example. Referring to FIG. 2, in the battery module 4, a plurality of secondary batteries 5 may be sequentially arranged in a length direction of the battery module 4. Certainly, the secondary batteries may alternatively be arranged in any other manner. Further, the plurality of secondary batteries 5 may be fastened through fasteners.

Optionally, the battery module 4 may further include a housing with an accommodating space, and the plurality of secondary batteries 5 are accommodated in the accommodating space.

In the present invention, the battery module assembled by using the secondary batteries may be further assembled into a battery pack, and a quantity of the battery modules included in the battery pack may be adjusted based on use and capacity of the battery pack.

Figure 3:
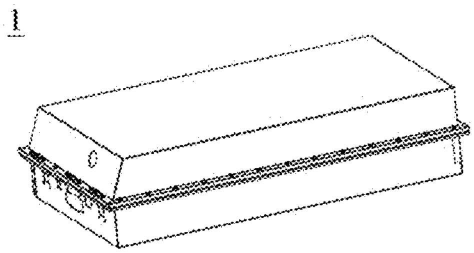
FIG. 3 is a schematic diagram of a battery pack according to an embodiment of this application.
Figure 4:
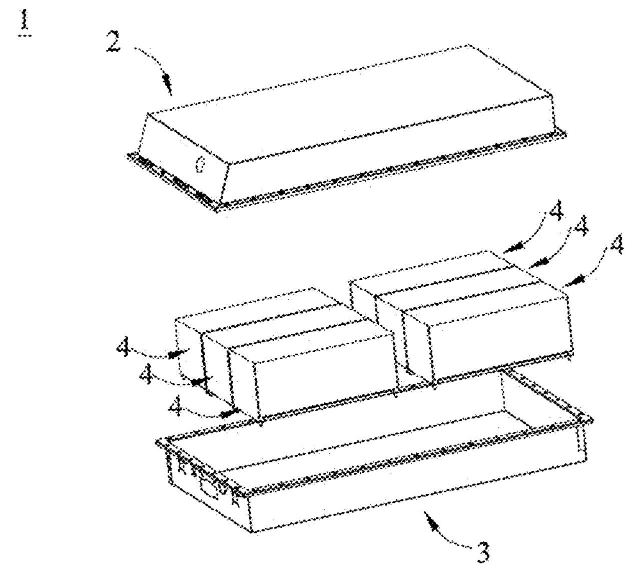
FIG. 4 is an exploded view of FIG. 3.

FIG. 3 and FIG. 4 are a battery pack 1 as an example. Referring to FIG. 3 and FIG. 4, the battery pack 1 may include a battery box and a plurality of battery modules 4 disposed in the battery box. The battery box includes an upper box body 2 and a lower box body 3. The upper box body 2 can cover the lower box body 3 to form an enclosed space for accommodating the battery modules 4. The plurality of battery modules 4 may be arranged in the battery box in any manner.

[Electric Apparatus]

This application further provides an electric apparatus. The electric apparatus includes the secondary battery provided in this application, and the secondary battery supplies power to the electric apparatus. The electric apparatus may be but is not limited to a mobile device (for example, a mobile phone or a notebook computer), an electric vehicle (for example, a battery electric vehicle, a hybrid electric vehicle, a plug-in hybrid electric vehicle, an electric bicycle, an electric scooter, an electric golf vehicle, or an electric truck), an electric train, a ship, a satellite, and an energy storage system.

The secondary battery, the battery module, or the battery pack may be selected for the electric apparatus based on requirements for using the electric apparatus.

Figure 5:
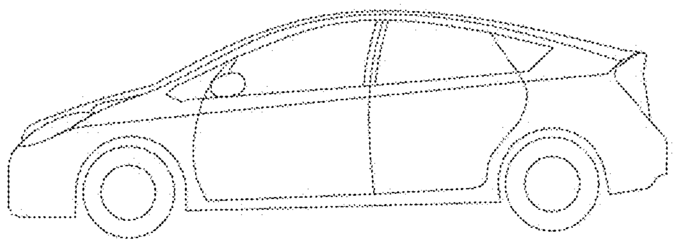
FIG. 5 is a schematic diagram of an electric apparatus according to an embodiment of this application.

FIG. 5 is an electric apparatus as an example. The electric apparatus is a battery electric vehicle, a hybrid electric vehicle, a plug-in hybrid electric vehicle, or the like. To satisfy a requirement of the electric apparatus for high power and high energy density of the secondary battery, a battery pack or a battery module may be used.

In another example, the electric apparatus may be a mobile phone, a tablet computer, a notebook computer, or the like. The electric apparatus is usually required to be light and thin, and the secondary battery may be used as a power source.

EXAMPLE

The following describes examples in this application. The examples described below are exemplary and only used to explain this application, but cannot be understood as limitations on this application. Examples in which specific technical solutions or conditions are not specified are made based on technical solutions or conditions described in documents in the art, or made based on a product specification. Reagents or instruments used are all conventional products that can be purchased on the market if no manufacturer is indicated.

Physicochemical parameter test methods of spinel-type nickel-manganese-lithium-containing composite oxides prepared in the following examples and comparative examples are as follows.

Content of elements in the spinel-type nickel-manganese-lithium-containing composite oxide material is measured in accordance with EPA 6010D-2014 inductively coupled plasma atomic emission spectrometry.

A median particle size by volume $D_v50$, which indicates a particle size of the material where the cumulative distribution by volume reaches 50%, of the spinel-type nickel-manganese-lithium-containing composite oxide material is measured by using Mastersizer 3000 laser particle size analyzer in accordance with GB/T 19077-2016 particle size analysis—laser diffraction methods.

Morphology of powder of the spinel-type nickel-manganese-lithium-containing composite oxide material is observed by using a field emission scanning electron microscope (ZEISS Sigma 300) in accordance with JY/T010-1996. In a scanning electron microscopic image, when one powder particle contains only one crystal or one crystal occupies more than half the volume of the powder particle, the powder particle is referred to as a monocrystalline particle; when one powder particle contains no more than 10 crystals with the same size, the powder particle is referred to as a quasi-monocrystalline particle; and when one powder particle contains more than 10 crystals, the powder particle is referred to as a polycrystalline particle.

A compacted density of the powder of the spinel-type nickel-manganese-lithium-containing composite oxide material is measured in accordance with GB/T 24533-2009 compacted density test methods.

A true density of the powder of the spinel-type nickel-manganese-lithium-containing composite oxide material is measured in accordance with GB/T 24586-2009 iron ores determination of apparent density, true density and porosity.

A specific surface area of the powder of the spinel-type nickel-manganese-lithium-containing composite oxide material is measured in accordance with GB/T 19587-2004 determination of the specific surface area of solids by gas adsorption using the BET method.

Example 1

S1: A lithium source (lithium carbonate) and a nickel manganese source (nickel manganese hydroxide with a particle size $D_v50$ being 3.8 microns) were weighed at a stoichiometric ratio of a body material.

S2: A P source ($NH_4H_2PO_4$) and a G source ($WO_3$) were weighed based on target doping content, and mixed with the body material in step S1 to obtain a raw material mixture.

S3: In an air or oxygen atmosphere, the raw material mixture obtained in step S2 was heated to 1000° C. at a temperature rise rate of 1° C./min, with the temperature kept for 10 hours, and then cooled to room temperature with a furnace to obtain a spinel-type nickel-manganese-lithium-containing composite oxide.

Figure 6:
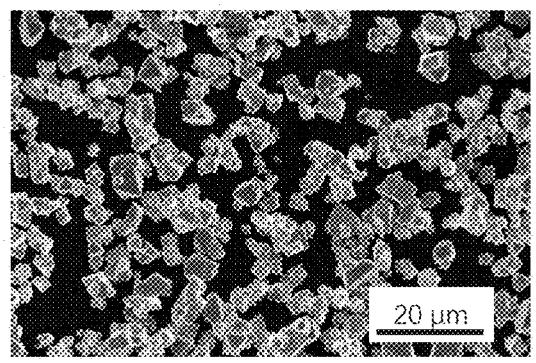
FIG. 6 is a morphology image of a spinel-type nickel-manganese-lithium-containing composite oxide material prepared in Example 1.

Table 1 shows the P source and the G source and the content of added elements P and G in step S2 of Example 1. Content of elements in the spinel-type nickel-manganese-lithium-containing composite oxide material prepared in Example 1 was tested, and the results are shown in Table 2. It can be learned that a chemical formula of the body material of the spinel-type nickel-manganese-lithium-containing composite oxide material prepared in Example 1 is $Li_{1.04}Ni_{0.51}Mn_{1.49}O_4$, and based on mass of the spinel-type nickel-manganese-lithium-containing composite oxide, doping content of the element P in the body material is 1.39%, and doping content of element W in the body material is 0.19%. FIG. 6 is a morphology image of the spinel-type nickel-manganese-lithium-containing composite oxide material prepared in Example 1, which is of quasi-monocrystalline morphology. When the spinel-type nickel-manganese-lithium-containing composite oxide is used as a positive electrode active material, battery performance of a secondary battery as a test object is shown in Table 3. Assembly methods and battery performance test methods of the secondary battery are described below.

[Assembly of Secondary Battery]

The spinel-type nickel-manganese-lithium-containing composite oxide material, conductive carbon black, and PVDF were mixed at a mass ratio of 96:2.5:1.5, an appropriate amount of N-methylpyrrolidone was added, and the mixture was stirred uniformly to obtain a positive electrode slurry. The positive electrode slurry was applied onto an aluminum foil, followed by drying, to obtain a positive electrode plate. A loading amount of the positive electrode active material on the positive electrode plate was 0.02 $g/cm^2$.

A negative electrode active material artificial graphite, conductive carbon black, and sodium carboxymethyl cellulose were mixed at a mass ratio of 96:1:3, an appropriate amount of deionized water was added, and the mixture was stirred uniformly to obtain a negative electrode slurry. The negative electrode slurry was applied onto a copper foil, followed by drying, to obtain a negative electrode plate. A loading amount of graphite on the negative electrode plate was 0.008 $g/cm^2$.

Ethylene carbonate (EC), ethyl methyl carbonate (EMC), and diethyl carbonate (DEC) were mixed at a volume ratio of 1:1:1, and then $LiPF_6$ was uniformly dissolved in such solution to obtain an electrolyte. In the electrolyte, a concentration of $LiPF_6$ was 1 mol/L.

A polypropylene film was used as a separator. The positive electrode plate, the separator, and the negative electrode plate prepared above were stacked in sequence, so that the separator was sandwiched between the positive electrode plate and the negative electrode plate for separation. Then the resulting stack was wound, and packaged with an aluminum plastic bag. The electrolyte was injected and then packaged, followed by formation and grading, to obtain the secondary battery.

[Performance Test for Secondary Battery]

1. Initial Discharge Capacity Test for Secondary Battery

The prepared secondary battery is used as a test object.

At 25° C., the secondary battery was charged to 4.9 V at a constant current of 0.3 C, then charged to 0.05 C at a constant voltage of 4.9 V, left standing for 5 min, and then discharged to 3.5 V at a constant current of 0.33 C. The discharge capacity was a discharge capacity of the secondary battery in the first cycle.

2. Storage Performance Test for Secondary Battery at Full Charge at High Temperature The prepared secondary battery is used as a test object.

At 25° C., the secondary battery was charged to 4.9 V at a constant current of 0.3 C, and then charged to 0.05 C at a constant voltage of 4.9 V. The secondary battery was placed at 45° C., a discharging process was performed every 5 d, and then the secondary battery was fully charged again and continued to be stored at 45° C. A discharge capacity value was extracted until the discharge capacity attenuated to 80% of the initial value, and the storage ended. Total duration of storage at 45° C. after full charge is storage duration at full charge at high temperature.

3. High-Temperature Cycling Performance Test for Secondary Battery

The prepared secondary battery is used as a test object.

At 45° C., the secondary battery was charged to 4.9 V at a constant current of 0.3 C, then charged to 0.05 C at a constant voltage of 4.9 V, left standing for 5 min, and then discharged to 3.5 V at a constant current of 0.33 C, which was one charge cycle process. A discharge capacity in the charge cycle process was a discharge capacity in the first cycle. After the full battery was subject to 200 charge cycles for the test according to the foregoing method, a remaining reversible discharge capacity was recorded.

Examples 2 to 4

Examples 2 to 4 were the same as Example 1 except that doped G sources were different. Specific P sources and G sources and content of added elements P and G are shown in Table 1. Structural features and element content test results of obtained spinel-type nickel-manganese-lithium-containing composite oxide materials are shown in Table 2. When the prepared spinel-type nickel-manganese-lithium-containing composite oxides are used as positive electrode active materials, battery performance of secondary batteries as test objects is shown in Table 3.

Examples 5 to 10

Example 5 to 10 were the same as Example 1 except that doping content of the P sources and G sources was different, Specific P sources and G sources and content of added elements P and G are shown in Table 1. Structural features and element content test results of obtained spinel-type nickel-manganese-lithium-containing composite oxide materials are shown in Table 2. When the prepared spinel-type nickel-manganese-lithium-containing composite oxides are used as positive electrode active materials, battery performance of secondary batteries as test objects is shown in Table 3.

Comparative Examples 1 to 9

Comparative Examples 1 to 9 were the same as Example 1 except that no P source was added in Comparative Example 1.

Comparative Examples 1 to 9 were the same as Example 1 except that no G source was added in Comparative Example 2.

Comparative Examples 1 to 9 were the same as Example 1 except that no P source or G source was added in Comparative Example 3.

Comparative Examples 1 to 9 were the same as Example 1 except that doping content of P sources and G sources in Comparative Examples 4 to 9 was different.

Specific P sources and G sources and content of added elements P and G are shown in Table 1. Structural features and element content test results of obtained spinel-type nickel-manganese-lithium-containing composite oxide materials are shown in Table 2. When the prepared spinel-type nickel-manganese-lithium-containing composite oxides are used as positive electrode active materials, battery performance of secondary batteries as test objects is shown in Table 3.

TABLE 1

P sources and G sources of spinel-type nickel-manganese-lithium-containing composite oxides prepared in Examples 1 to 10 and Comparative Examples 1 to 9

| No. | P source | G source | Target doping content of element P | Type of element G | Target doping content of element G |
|---|---|---|---|---|---|
| Example 1 | $NH_4H_2PO_4$ | $WO_3$ | 1.40% | W | 0.20% |
| Example 2 | $NH_4H_2PO_4$ | $Nb_2O_5$ | 1.40% | Nb | 0.20% |
| Example 3 | $NH_4H_2PO_4$ | $SbO_2$ | 1.40% | Sb | 0.20% |
| Example 4 | $NH_4H_2PO_4$ | $SbO_2$ | 1.40% | W | 0.06% |
| | | $WO_3$ | | Nb | 0.07% |
| | | $Nb_2O_5$ | | Sb | 0.07% |
| Example 5 | $NH_4H_2PO_4$ | $WO_3$ | 0.50% | W | 0.20% |
| Example 6 | $NH_4H_2PO_4$ | $WO_3$ | 1.00% | W | 0.20% |
| Example 7 | $NH_4H_2PO_4$ | $WO_3$ | 3.00% | W | 0.20% |
| Example 8 | $NH_4H_2PO_4$ | $WO_3$ | 1.40% | W | 0.07% |
| Example 9 | $NH_4H_2PO_4$ | $WO_3$ | 1.40% | W | 0.10% |
| Example 10 | $NH_4H_2PO_4$ | $WO_3$ | 0.50% | W | 0.05% |
| Comparative Example 1 | — | $WO_3$ | — | W | 0.20% |
| Comparative Example 2 | $NH_4H_2PO_4$ | — | 1.40% | — | — |
| Comparative Example 3 | — | — | — | — | — |
| Comparative Example 4 | $NH_4H_2PO_4$ | $WO_3$ | 0.30% | W | 0.20% |
| Comparative Example 5 | $NH_4H_2PO_4$ | $WO_3$ | 4.00% | W | 0.20% |
| Comparative Example 6 | $NH_4H_2PO_4$ | $WO_3$ | 1.40% | W | 0.03% |
| Comparative Example 7 | $NH_4H_2PO_4$ | $WO_3$ | 1.40% | W | 0.50% |
| Comparative Example 8 | $NH_4H_2PO_4$ | $WO_3$ | 0.50% | W | 0.30% |
| Comparative Example 9 | $NH_4H_2PO_4$ | $WO_3$ | 2.00% | W | 0.08% |

Note:

The content of elements P and G is calculated based on standard nickel manganese spinel composition $LiNi_{0.5}Mn_{1.5}O_4$.

TABLE 2

Structural features of spinel-type nickel-manganese-lithium-containing composite oxides prepared in Examples 1 to 10 and Comparative Examples 1 to 9 and actual doping content of elements P and G

| No. | Body material | Actual doping content k of element P | Type of element G | Actual doping content g of element G | k/g |
|---|---|---|---|---|---|
| Example 1 | $Li_{1.04}Ni_{0.51}Mn_{1.49}O_4$ | 1.39% | W | 0.19% | 7.32 |
| Example 2 | $Li_{1.05}Ni_{0.51}Mn_{1.49}O_4$ | 1.37% | Nb | 0.21% | 6.52 |
| Example 3 | $Li_{1.03}Ni_{0.51}Mn_{1.49}O_4$ | 1.41% | Sb | 0.19% | 7.42 |
| Example 4 | $Li_{1.04}Ni_{0.51}Mn_{1.49}O_4$ | 1.38% | W | 0.06% | 6.90 |
| | | | Nb | 0.08% | |
| | | | Sb | 0.06% | |
| Example 5 | $Li_{1.01}Ni_{0.51}Mn_{1.49}O_4$ | 0.50% | W | 0.19% | 2.63 |
| Example 6 | $Li_{1.04}Ni_{0.51}Mn_{1.49}O_4$ | 0.99% | W | 0.18% | 5.50 |
| Example 7 | $Li_{1.11}Ni_{0.51}Mn_{1.49}O_4$ | 2.95% | W | 0.20% | 14.75 |
| Example 8 | $Li_{1.02}Ni_{0.51}Mn_{1.49}O_4$ | 1.38% | W | 0.07% | 19.71 |
| Example 9 | $Li_{1.03}Ni_{0.51}Mn_{1.49}O_4$ | 1.39% | W | 0.11% | 12.64 |
| Example 10 | $Li_{1.02}Ni_{0.51}Mn_{1.49}O_4$ | 0.48% | W | 0.05% | 9.60 |
| Comparative Example 1 | $Li_{0.99}Ni_{0.51}Mn_{1.49}O_4$ | — | W | 0.21% | — |
| Comparative Example 2 | $Li_{1.02}Ni_{0.51}Mn_{1.49}O_4$ | 1.38% | — | — | — |
| Comparative Example 3 | $Li_{1.00}Ni_{0.51}Mn_{1.49}O_4$ | — | — | — | — |
| Comparative Example 4 | $Li_{1.01}Ni_{0.51}Mn_{1.49}O_4$ | 0.28% | W | 0.18% | 1.56 |
| Comparative Example 5 | $Li_{1.11}Ni_{0.51}Mn_{1.49}O_4$ | 3.97% | W | 0.19% | 20.89 |
| Comparative Example 6 | $Li_{1.06}Ni_{0.51}Mn_{1.49}O_4$ | 1.39% | W | 0.03% | 46.33 |
| Comparative Example 7 | $Li_{1.05}Ni_{0.51}Mn_{1.49}O_4$ | 1.41% | W | 0.48% | 2.94 |
| Comparative Example 8 | $Li_{1.02}Ni_{0.51}Mn_{1.49}O_4$ | 0.48% | W | 0.29% | 1.66 |
| Comparative Example 9 | $Li_{1.07}Ni_{0.51}Mn_{1.49}O_4$ | 2.01% | W | 0.07% | 28.71 |

TABLE 3

Battery performance when spinel-type nickel-manganese-lithium-containing composite oxides prepared in Examples 1 to 10 and Comparative Examples 1 to 9 are used as positive electrode active materials

| No. | Discharge capacity of secondary battery in the first cycle (mAh/g) | Storage days of secondary battery at full charge at 45° C. (d) | Capacity of secondary battery after 200 cycles at 45° C. (mAh/g) |
|---|---|---|---|
| Example 1 | 132.6 | 151 | 103.6 |
| Example 2 | 129.8 | 163 | 102.8 |
| Example 3 | 127.4 | 172 | 101.6 |
| Example 4 | 131.5 | 161 | 103.1 |
| Example 5 | 130.1 | 129 | 102.7 |
| Example 6 | 131.8 | 143 | 103.1 |
| Example 7 | 127.9 | 207 | 103.2 |
| Example 8 | 128.5 | 165 | 103.1 |
| Example 9 | 129.8 | 170 | 103.9 |
| Example 10 | 135.7 | 109 | 100.5 |
| Comparative Example 1 | 128.7 | 55 | 98.5 |
| Comparative Example 2 | 132.1 | 63 | 97.4 |
| Comparative Example 3 | 130.1 | 23 | 95.1 |

TABLE 3-continued

Battery performance when spinel-type nickel-manganese-lithium-containing composite oxides prepared in Examples 1 to 10 and Comparative Examples 1 to 9 are used as positive electrode active materials

| No. | Discharge capacity of secondary battery in the first cycle (mAh/g) | Storage days of secondary battery at full charge at 45° C. (d) | Capacity of secondary battery after 200 cycles at 45° C. (mAh/g) |
|---|---|---|---|
| Comparative Example 4 | 129.1 | 76 | 99.8 |
| Comparative Example 5 | 116.2 | 98 | 95.3 |
| Comparative Example 6 | 133.1 | 93 | 99.3 |
| Comparative Example 7 | 131.5 | 85 | 98.2 |
| Comparative Example 8 | 133.6 | 89 | 98.3 |
| Comparative Example 9 | 130.5 | 99 | 99.8 |

It can be learned from the results recorded in Table 1, Table 2, and Table 3 that compared with Comparative Examples 1 to 3 in which only at most one of the P source and the G source was added in preparation of the spinel-type nickel-manganese-lithium-containing composite oxides, both the P source and the G source were doped in Examples 1 to 10. When the obtained spinel-type nickel-manganese-lithium-containing composite oxides are used as the positive electrode materials of the batteries, the batteries can have good high-temperature storage performance (reflected by the storage days at full charge at 45° C.) and high-temperature cycling performance (jointly reflected by the discharge capacity in the first cycle and the capacity after 200 cycles at 45° C.). Compared with Comparative Examples 4 to 9 in which both the P source and the G source were doped in preparation of the spinet-type nickel-manganese-lithium-containing composite oxides, both the P source and the G source were also doped in Examples 1 to 10, and elements P and G doped in the prepared spinel-type nickel-manganese-lithium-containing composite oxide materials satisfied the following conditions. When the obtained spinel-type nickel-manganese-lithium-containing composite oxides are used as the positive electrode materials of the batteries, the batteries can have good high-temperature storage performance (reflected by the storage days at full charge at 45° C.) and high-temperature cycling performance (jointly reflected by the discharge capacity in the first cycle and the capacity after 200 cycles at 45° C.): based on mass of the spinel-type nickel-manganese-lithium-containing composite oxide, doping content of the element P satisfies 0.48 wt %≤k≤3.05 wt %, doping content of the element G (one or more elements selected from elements Nb, W, and Sb) satisfies 0.05 wt %≤g≤0.31 wt %, and 2≤k/g≤20. Especially, when 1.36 wt %≤k≤2.95 wt %, 0.07 wt %≤g≤0.21 wt %, and 6≤k/g≤20 are satisfied, the secondary battery has better high-temperature storage performance and high-temperature cycling performance.

Examples 11 and 12

Based on Example 1, additional additives were added in step S1 in Examples 11 and 12. The additive added in Example 11 was $TiO_2$, and the additive added in Example 12 was LiF. Structural features and element content test results of obtained spinel-type nickel-manganese-lithium-containing composite oxide materials in Examples 11 and 12 are shown in Table 4. When the prepared spinel-type nickel-manganese-lithium-containing composite oxides are used as positive electrode active materials, battery performance of secondary batteries as test objects is shown in Table 5.

TABLE 4

Structural features of spinel-type nickel-manganese-lithium-containing composite oxides prepared in Examples 11 and 12 and actual doping content of elements P and G

| No. | Body material | Actual doping content k of element P | Type of element G | Actual doping content g of element G | k/g |
|---|---|---|---|---|---|
| Example 11 | $Li_{1.04}Ni_{0.50}Mn_{1.47}Ti_{0.03}O_4$ | 1.37% | W | 0.19% | 7.21 |
| Example 12 | $Li_{1.05}Ni_{0.51}Mn_{1.49}O_{3.9}F_{0.1}$ | 1.41% | W | 0.18% | 7.83 |

TABLE 5

Battery performance when spinel-type nickel-manganese-lithium-containing composite oxides prepared in Examples 11 to 12 are used as positive electrode active materials

| No. | Discharge capacity of secondary battery in the first cycle (mAb/g) | Storage days of secondary battery at full charge at 45° C. (d) | Capacity of secondary battery after 200 cycles at 45° C. (mAh/g) |
|---|---|---|---|
| Example 11 | 135.1 | 125 | 100.4 |
| Example 12 | 130.7 | 159 | 101.0 |

It can be learned from the results recorded in Table 4 and Table 5 that when the additional additives are added in the body materials of the prepared spinel-type nickel-manganese-lithium-containing composite oxides, and the obtained spinel-type nickel-manganese-lithium-containing composite oxides are used as the positive electrode active materials of the batteries, the batteries can still have good high-temperature storage performance and high-temperature cycling performance. Such additive may include a cation additive or an anion additive. The cation additive may be selected from one or more of Ti, Zr, La, Co, Mg, Zn, Al, Mo, V, Cr, and B, and the anion additive may be selected from one or two of F and Cl.

Example 13

S1: The lithium source (lithium carbonate) and the nickel manganese source (nickel manganese hydroxide with a particle size $D_v50$ being 3.8 microns) were weighed at a stoichiometric ratio of a body material.

S2: The P source ($NH_4H_2PO_4$) and the G source ($WO_3$) were weighed based on target doping content, and mixed with the body material in step S1 to obtain a raw material mixture.

S3: In the air or oxygen atmosphere, the raw material mixture obtained in step S2 was heated to 1000° C. at the temperature rise rate of 1° C./min, with the temperature kept for 10 hours, and then cooled to room temperature with the furnace to obtain a resulting product of the high-temperature heat treatment.

S4: The resulting product of the high-temperature heat treatment in step S3 was subject to ball milling for 5 h.

S5: In the air or oxygen atmosphere, the product obtained through ball milling in step S4 was heated to 650° C., with the temperature kept for 15 hours, and then cooled to room temperature with the furnace to obtain a spinel-type nickel-manganese-lithium-containing composite oxide.

Content of elements in the spinel-type nickel-manganese-lithium-containing composite oxide material prepared in Example 13 is tested, and results are shown in Table 6. When the spinel-type nickel-manganese-lithium-containing composite oxide is used as a positive electrode active material, battery performance of a button half battery and a secondary battery as test objects is shown in Table 7.

Examples 14 and 15

Examples 14 and 15 were the same as Example 13 except that doping content of the P sources and G sources was different. Structural features and element content test results of obtained spinel-type nickel-manganese-lithium-containing composite oxide materials are shown in Table 6. When the prepared spinel-type nickel-manganese-lithium-containing composite oxides are used as positive electrode active materials, battery performance of a button half battery and a secondary battery as test objects is shown in Table 7. Assembly methods and performance test methods of the button half battery are as follows.

Example 16

Example 16 was the same as Example 13 except that doping content of the P source and G source was different and a product obtained through ball milling in step S4 was healed to 500° C. in step S5. Structural features and element content test results of an obtained spinel-type nickel-manganese-lithium-containing composite oxide material are shown in Table 6. When the prepared spinel-type nickel-manganese-lithium-containing composite oxide is used as a positive electrode active material, battery performance of a button half battery and a secondary battery as test objects is shown in Table 7. Assembly methods and performance test methods of the button half battery are as follows.

[Assembly of Button Half Battery]

The spinel-type nickel-manganese-lithium-containing composite oxide material, conductive carbon black, and PVDF were mixed at a mass ratio of 90:5:5, an appropriate amount of N-methylpyrrolidone was added, and the mixture was stirred uniformly to obtain a positive electrode slurry. The positive electrode slurry was applied onto an aluminum foil, followed by drying, to obtain a positive electrode plate. A loading amount of the positive electrode active material on the positive electrode plate was 0.015 g/cm$^2$. The prepared positive electrode plate was cut into wafers with a diameter of 14 mm.

Ethylene carbonate (EC), ethyl methyl carbonate (EMC), and diethyl carbonate (DEC) were mixed at a volume ratio of 1:1:1, and then $LiPF_6$ was uniformly dissolved in such solution to obtain an electrolyte. In the electrolyte, a concentration of $LiPF_6$ was 1 mol/L.

A polypropylene film (for example, wafers with a thickness of 12 μm and a diameter of 16 mm) was used as a separator.

A lithium metal sheet with a diameter of 15 mm was used as a counter electrode.

The lithium metal sheet, the separator, and the positive electrode plate wafers were stacked in sequence, so that the separator was sandwiched between the lithium metal sheet and the positive electrode plate wafers for separation. The electrolyte was injected, and a CR2030 button battery was assembled and left standing for 24 h to obtain the button half battery.

[Charge Capacity Proportion Test]

At 25° C., the prepared button half battery was charged to 4.95 V at a constant current rate of 0.1 C, then charged to 0.05 C at a constant voltage of 4.95 V, left standing for 5 min, and discharged to 3.5 V at a constant current rate of 0.1 C. An average charge capacity ($Q_1$) at 4.4 V-3.5 V and an average charge capacity ($Q_2$) at 4.95 V-3.5 V are extracted from original charge data of the first charge to calculate Q1/Q2.

TABLE 6

Structural features of spinel-type nickel-manganese-lithium-containing composite oxides prepared in Examples 13 to 16 and actual doping content of elements P and G

| No. | Body material | Actual doping content k of the element P | Type of element G | Actual doping content g of the element G | k/g |
|---|---|---|---|---|---|
| Example 13 | $Li_{1.06}Ni_{0.51}Mn_{1.49}O_4$ | 2.01% | W | 0.20% | 10.05 |
| Example 14 | $Li_{1.05}Ni_{0.51}Mn_{1.49}O_4$ | 1.42% | W | 0.29% | 4.90 |
| Example 15 | $Li_{1.10}Ni_{0.51}Mn_{1.49}O_4$ | 3.02% | W | 0.31% | 9.74 |
| Example 16 | $Li_{1.06}Ni_{0.51}Mn_{1.49}O_4$ | 2.03% | W | 0.21% | 9.67 |

TABLE 7

Battery performance when spinel-type nickel-manganese-lithium-containing composite oxides prepared in Examples 13 to 16 are used as positive electrode active materials

| No. | Charge capacity of button half battery in the first cycle at 0.1 C (mAh/g) 3.5 V-4.95 V | 3.5 V-4.4 V | Charge capacity proportion at 4 V plateau (%) | Discharge capacity of secondary battery in the first cycle (mAh/g) | Storage days of secondary battery at full charge at 45° C. (d) | Capacity of secondary battery after 200 cycles at 45° C. (mAh/g) |
|---|---|---|---|---|---|---|
| Example 13 | 140.4 | 3.7 | 2.6 | 132.4 | 175 | 103.9 |
| Example 14 | 141.5 | 3.6 | 2.5 | 133.1 | 138 | 104.1 |
| Example 15 | 133.2 | 3.9 | 2.9 | 125.7 | 198 | 103.4 |
| Example 16 | 138.6 | 4.4 | 3.2 | 125.1 | 134 | 101.6 |

It can be learned from the results recorded in Table 6 and Table 7 that in the preparation method of spinel-type nickel-manganese-lithium-containing composite oxide material in Examples 13 to 15, the product obtained through ball milling in step S4 is further subject to annealing treatment at appropriate temperature. When the obtained spinel-type nickel-manganese-lithium-containing composite oxide is charged/discharged at 0.1 C in the button half battery, the proportion of the charge capacity at 3.5 V-4.4 V in the first cycle to the charge capacity at 3.5 V-4.95 V in the first cycle is <3%, indicating low content of $Mn^{3+}$ and high content of ordered phase $P4_332$ in the prepared spinel-type nickel-manganese-lithium-containing composite oxide material, which is conducive to long-term stability of the battery at high temperature and high voltage. The secondary battery is used as a test object, and the results indicate that the secondary battery has better high-temperature storage performance and high-temperature cycling performance. The product obtained through ball milling in step S4 was subject to annealing treatment at low annealing temperature in Example 16. The obtained spinel-type nickel-manganese-lithium-containing composite oxide can also ensure good high-temperature storage performance and high-temperature cycling performance of the secondary battery, but causes an increase in the proportion of the charge capacity at 3.5 V-4.4 V in the first cycle to the charge capacity at 3.5 V-4.95 V in the first cycle.

Examples 17 to 27

Examples 17 to 27 were the same as Example 13 except that process parameters of the high-temperature heat treatment in step S3 or process parameters of the annealing treatment in step S5 were adjusted according to Table 8 (especially, the particle size $D_v50$ of the nickel manganese hydroxide used in Example 23=1.7 μm). Element content test results and physicochemical parameters of the obtained spinel-type nickel-manganese-lithium-containing composite oxide materials are shown in Table 9 and Table 10 respectively. When the prepared spinel-type nickel-manganese-lithium-containing composite oxides are used as positive electrode active materials, battery performance of secondary batteries as test objects is shown in Table 11.

TABLE 8

Process parameters of high-temperature heat treatment and annealing treatment of spinel-type nickel-manganese-lithium-containing composite oxides prepared in Examples 17 to 27

| No. | Step S3: high-temperature heat treatment Temperature rise rate (° C./min) | Temperature (° C.) | Time (h) | Step S5: annealing treatment Temperature (° C.) | Time (h) |
|---|---|---|---|---|---|
| Example 17 | 0.5 | 1000 | 10 | 650 | 15 |
| Example 18 | 3 | 1000 | 10 | 650 | 15 |
| Example 19 | 1 | 910 | 10 | 650 | 15 |
| Example 20 | 1 | 1050 | 10 | 650 | 15 |
| Example 21 | 1 | 1000 | 5 | 650 | 15 |
| Example 22 | 1 | 1000 | 30 | 650 | 15 |
| Example 23 | 1 | 1000 | 10 | 650 | 15 |
| Example 24 | 1 | 1000 | 10 | 600 | 15 |
| Example 25 | 1 | 1000 | 10 | 700 | 15 |
| Example 26 | 1 | 1000 | 10 | 650 | 5 |
| Example 27 | 1 | 1000 | 10 | 650 | 50 |

TABLE 9

Structural features of spinel-type nickel-manganese-lithium-containing composite oxides prepared in Examples 17 to 27 and actual doping content of elements P and G

| No. | Body material | Actual doping content k of the element P | Type of element G | Actual doping content g of the element G | k/g |
|---|---|---|---|---|---|
| Example 17 | $Li_{1.06}Ni_{0.51}Mn_{1.49}O_4$ | 1.38% | W | 0.19% | 7.26 |
| Example 18 | $Li_{1.03}Ni_{0.51}Mn_{1.49}O_4$ | 1.39% | W | 0.18% | 7.72 |
| Example 19 | $Li_{1.05}Ni_{0.51}Mn_{1.49}O_4$ | 1.41% | W | 0.19% | 7.42 |
| Example 20 | $Li_{1.03}Ni_{0.51}Mn_{1.49}O_4$ | 1.40% | W | 0.21% | 6.67 |
| Example 21 | $Li_{1.05}Ni_{0.51}Mn_{1.49}O_4$ | 1.38% | W | 0.18% | 7.67 |

TABLE 9-continued

Structural features of spinel-type nickel-manganese-lithium-containing composite oxides prepared in Examples 17 to 27 and actual doping content of elements P and G

| No. | Body material | Actual doping content k of the element P | Type of element G | Actual doping content g of the element G | k/g |
|---|---|---|---|---|---|
| Example 22 | $Li_{1.03}Ni_{0.51}Mn_{1.49}O_{3.9}$ | 1.40% | W | 0.19% | 7.37 |
| Example 23 | $Li_{1.05}Ni_{0.50}Mn_{1.50}O_4$ | 1.39% | W | 0.20% | 6.95 |
| Example 24 | $Li_{1.04}Ni_{0.51}Mn_{1.49}O_4$ | 1.37% | W | 0.21% | 6.52 |
| Example 25 | $Li_{1.04}Ni_{0.51}Mn_{1.49}O_{3.9}$ | 1.36% | W | 0.19% | 7.16 |
| Example 26 | $Li_{1.05}Ni_{0.51}Mn_{1.49}O_{3.9}$ | 1.41% | W | 0.18% | 7.83 |
| Example 27 | $Li_{1.05}Ni_{0.51}Mn_{1.49}O_4$ | 1.40% | W | 0.20% | 7.00 |

TABLE 10

Physicochemical parameters of spinel-type nickel-manganese-lithium-containing composite oxides prepared in Examples 17 to 27

| No. | $D_v50$ of powder (μm) | Type of particle | True density (g/cm$^3$) | BET (m$^2$/g) |
|---|---|---|---|---|
| Example 17 | 6.3 | Single crystal | 4.63 | 0.27 |
| Example 18 | 8.0 | Quasi-single crystal | 4.58 | 0.35 |
| Example 19 | 3.9 | Quasi-single crystal | 4.46 | 0.86 |
| Example 20 | 14.1 | Single crystal | 4.65 | 0.13 |
| Example 21 | 4.5 | Quasi-single crystal | 4.47 | 0.74 |
| Example 22 | 9.2 | Single crystal | 4.61 | 0.24 |
| Example 23 | 5.9 | Single crystal | 4.53 | 0.30 |
| Example 24 | 7.3 | Quasi-single crystal | 4.51 | 0.37 |
| Example 25 | 8.1 | Quasi-single crystal | 4.52 | 0.29 |
| Example 26 | 7.2 | Quasi-single crystal | 4.49 | 0.32 |
| Example 27 | 7.9 | Quasi-single crystal | 4.50 | 0.31 |

TABLE 11

Battery performance when spinel-type nickel-manganese-lithium-containing composite oxides prepared in Examples 17 to 27 are used as positive electrode active materials

| No. | Discharge capacity of secondary battery in the first cycle (mAb/g) | Storage days of secondary battery at full charge at 45° C. (d) | Capacity of secondary battery after 200 cycles at 45° C. (mAh/g) |
|---|---|---|---|
| Example 17 | 134.1 | 167 | 104.1 |
| Example 18 | 130.2 | 138 | 102.9 |
| Example 19 | 133.5 | 137 | 101.3 |
| Example 20 | 128.7 | 195 | 102.5 |
| Example 21 | 130.1 | 125 | 100.9 |
| Example 22 | 129.6 | 186 | 103.5 |
| Example 23 | 133.6 | 142 | 101.9 |
| Example 24 | 132.5 | 146 | 103.3 |
| Example 25 | 129.5 | 135 | 101.8 |
| Example 26 | 130.7 | 135 | 102.7 |
| Example 27 | 133.1 | 186 | 103.1 |

Figure 7:
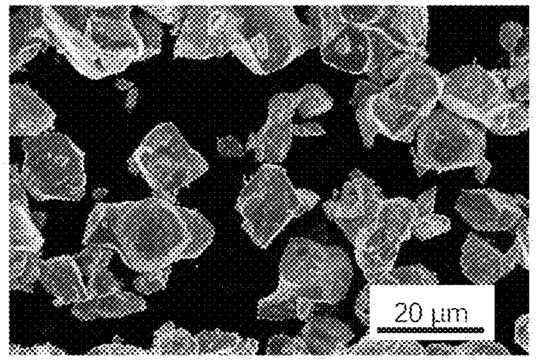
FIG. 7 is a morphology image of a spinel-type nickel-manganese-lithium-containing composite oxide material prepared in Example 20.
Figure 8:
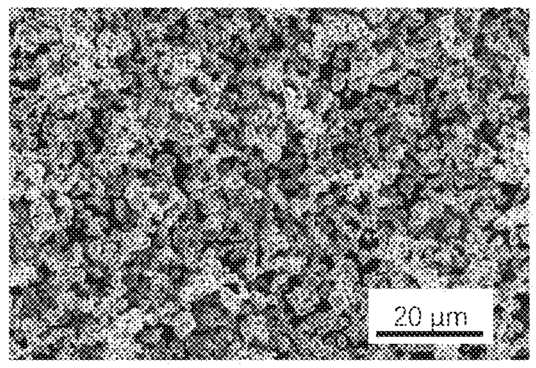
FIG. 8 is a morphology image of a spinel-type nickel-manganese-lithium-containing composite oxide material prepared in Example 23.

It can be learned from the results recorded in Tables 8 to 11 that based on the process parameters of the high-temperature heat treatment and the annealing treatment shown in Table 8, the spinel-type nickel-manganese-lithium-containing composite oxide materials with similar structural features can be obtained as in Example 3. The morphology and particle sizes of the powder of these spinel-type nickel-manganese-lithium-containing composite oxide materials are tested, and the test results show that the materials are of quasi-monocrystalline morphology or monocrystalline morphology with the particle size $D_v50$ of the power within the range of 2-15 μm. FIG. 7 and FIG. 8 are respectively morphology images of the spinel-type nickel-manganese-lithium-containing composite oxide materials prepared in Examples 20 and 23. Large single crystals of the power of the material with the particle size $D_v50$ being 14.1 μm were obtained in Example 20, and small single crystals of the power of the material with the particle size $D_v50$ being 5.9 μm were obtained in Example 23. The specific surface areas and true densities of these spinel-type nickel-manganese-lithium-containing composite oxide materials are tested, and the test results show that the specific surface area of the material is generally less than or equal to 1 m$^2$/g, and the true density is generally larger than or equal to 4.45 g/cm$^3$. A higher true density of a material indicates a higher limit value of a compacted density of an active membrane in an electrode plate, and a small specific surface area is more conducive to reducing side reactions on a surface. When the spinel-type nickel-manganese-lithium-containing composite oxides prepared in Examples 17 to 27 are used as the positive electrode active materials, the secondary batteries can also have good high-temperature storage performance and high-temperature cycling performance shown in Table 11.

Example 28

S1: The lithium source (lithium carbonate) and the nickel manganese source (nickel manganese hydroxide with a particle size $D_v50$ being 3.8 microns) were weighed at a stoichiometric ratio of a body material.

S2: The P source ($NH_4H_{22}PO_4$) and the G source ($WO_3$) were weighed based on target doping content, and mixed with the body material in step S1 to obtain a raw material mixture.

S3: In the air or oxygen atmosphere, the raw material mixture obtained in step S2 was heated to 1000° C. at the temperature rise rate of 1° C./min, with the temperature kept for 10 hours, and then cooled to room temperature with the furnace to obtain a resulting product of the high-temperature heat treatment.

S4: The resulting product of the high-temperature heat treatment in step S3 was mixed with a coating material ($B_2O_3$) and then subject to ball milling for 5 h.

S5: In the air or oxygen atmosphere, the product obtained through ball milling in step S4 was heated to 650° C. with the temperature kept for 15 hours, and then cooled to room temperature with the furnace to obtain a spinel-type nickel-manganese-lithium-containing composite oxide.

Examples 29 to 33

Examples 29 to 33 were the same as Example 28 except that added coating materials and content thereof were different. Specifically, $Al_2O_3$ was used as the coating material in Examples 29 to 33. Structural features and element content test results of obtained spinel-type nickel-manganese-lithium-containing composite oxide materials in the examples are shown in Table 12. When the prepared spinel-type nickel-manganese-lithium-containing composite oxides are used as positive electrode active materials, battery performance of secondary batteries as test objects is shown in Table 13.

TABLE 12

Content of elements in spinel-type nickel-manganese-lithium-containing composite oxide materials prepared in Examples 28 to 33

| | | | | | | Coating layer | |
|---|---|---|---|---|---|---|---|
| No. | Body material | Actual doping content k of the element P | Type of element G | Actual doping content g of the element G | k/g | Type of coating element | Mass content of coating element |
| Example 28 | $Li_{1.05}Ni_{0.51}Mn_{1.49}O_4$ | 1.41% | W | 0.20% | 7.05 | B | 0.35% |
| Example 29 | $Li_{1.06}Ni_{0.51}Mn_{1.49}O_4$ | 1.38% | W | 0.21% | 6.57 | Al | 0.54% |
| Example 30 | $Li_{1.04}Ni_{0.51}Mn_{1.49}O_4$ | 1.39% | W | 0.20% | 6.95 | Al | 0.04% |
| Example 31 | $Li_{1.04}Ni_{0.51}Mn_{1.49}O_4$ | 1.40% | W | 0.21% | 6.67 | Al | 0.27% |
| Example 32 | $Li_{1.05}Ni_{0.51}Mn_{1.49}O_4$ | 1.40% | W | 0.19% | 7.37 | Al | 0.96% |
| Example 33 | $Li_{1.05}Ni_{0.51}Mn_{1.49}O_4$ | 1.39% | W | 0.18% | 7.72 | Al | 1.93% |

TABLE 13

Battery performance when spinel-type nickel-manganese-lithium-containing composite oxides prepared in Examples 28 to 33 are used as positive electrode active materials

| No. | Discharge capacity of secondary battery in the first cycle (mAb/g) | Storage days of secondary battery at full charge at 45° C. (d) | Capacity of secondary battery after 200 cycles at 45° C. (mAh/g) |
|---|---|---|---|
| Example 28 | 131.5 | 125 | 100.8 |
| Example 29 | 130.9 | 165 | 101.2 |
| Example 30 | 132.4 | 156 | 103.7 |
| Example 31 | 132.1 | 168 | 103.9 |
| Example 32 | 129.5 | 235 | 104.1 |
| Example 33 | 124.1 | 246 | 100.7 |

It can be learned from the results recorded in Table 12 and Table 13 that the coating material can be used for coating the spinel-type nickel-manganese-lithium-containing composite oxide material, and the amount of the coating layer may be calculated based on the specific content of the selected coating element. When the prepared coated spinel-type nickel-manganese-lithium-containing composite oxide materials are used as the positive electrode materials of the batteries, the batteries can also have good high-temperature storage performance and high-temperature cycling performance. In the coating treatment operation, the coating material may be selected from one or more of the following: aluminum oxide, titanium oxide, boron oxide, zirconium oxide, silicon dioxide, and lithium-containing composite oxide that contains one or more of aluminum, titanium, boron, zirconium, and silicon. The coating material such as aluminum oxide and boron oxide can physically separate an electrolyte from a positive electrode material and also be used as a consumable (consume itself to protect the body material), thereby further improving overall performance of the spinel-type nickel-manganese-lithium-containing composite oxide material.

It should be noted that this application is not limited to the foregoing embodiments. The foregoing embodiments are merely examples, and embodiments having constructions substantially the same as those of the technical idea and having the same effects as the technical idea within the scope of the technical solutions of this application are all included in the technical scope of this application. In addition, within the scope without departing from the essence of this application, various modifications that can be conceived by persons skilled in the art are applied to the embodiments, and other modes constructed by combining some of the constituent elements in the embodiments are also included in the scope of this application.

The invention claimed is:

1. A spinel-type nickel-manganese-lithium-containing composite oxide, comprising:

a body material, represented by a general formula $Li_xNi_yMn_zM_mO_{4-q}Q_q$, wherein M is selected from one or more of Ti, Zr, La, Co, Mg, Zn, Al, Mo, V, Cr, and B, Q is selected from one or two of F and Cl, $0.95 \le x \le 1.1$, $0.45 \le y \le 0.55$, $1.4 \le z \le 1.55$, $0 \le m \le 0.05$, and $0 \le q \le 1$; and doping elements, doped in the body material, wherein the doping elements comprise element P and one or more elements selected from elements W, and Sb, wherein the one or more elements are denoted as element G; wherein based on mass of the spinel-type nickel-manganese-lithium-containing composite oxide, doping content of the element P is denoted as k, 0.48 wt %≤k≤3.05 wt %, doping content of the element G is denoted as g, 0.05 wt %≤g≤0.31 wt %, and the spinel-type nickel-manganese-lithium-containing composite oxide satisfies 2≤k/g≤20.

2. The spinel-type nickel-manganese-lithium-containing composite oxide according to claim 1, wherein $1.36 \text{ wt } \% \le k \le 2.95 \text{ wt } \%$;

$0.07 \text{ wt } \% \le g \le 0.21 \text{ wt } \%$;

$6 \le k/g \le 20$.

3. The spinel-type nickel-manganese-lithium-containing composite oxide according to claim 1, wherein a doping content of the element P and a doping content of the element G decrease from a surface of the body material to an inside thereof.

4. The spinel-type nickel-manganese-lithium-containing composite oxide according to claim 1, wherein the spinel-type nickel-manganese-lithium-containing composite oxide is of quasi-monocrystalline morphology or monocrystalline morphology.

5. The spinel-type nickel-manganese-lithium-containing composite oxide according to claim 1, wherein a specific surface area of the spinel-type nickel-manganese-lithium-containing composite oxide is $\le 1 \text{ m}^2/\text{g}$.

6. The spinel-type nickel-manganese-lithium-containing composite oxide according to claim 5, wherein the specific surface area of the spinel-type nickel-manganese-lithium-containing composite oxide is $0.1 \text{ m}^2/\text{g}$-$0.8 \text{ m}^2/\text{g}$.

7. The spinel-type nickel-manganese-lithium-containing composite oxide according to claim 1, wherein a true density of the spinel-type nickel-manganese-lithium-containing composite oxide is $\ge 4.45 \text{ g/cm}^3$.

8. The spinel-type nickel-manganese-lithium-containing composite oxide according to claim 7, wherein the true density of the spinel-type nickel-manganese-lithium-containing composite oxide is $4.5 \text{ g/cm}^3$-$4.7 \text{ g/cm}^3$.

9. The spinel-type nickel-manganese-lithium-containing composite oxide according to claim 1, wherein a median particle size by volume $D_v50$ of the spinel-type nickel-manganese-lithium-containing composite oxide is 2-15 μm.

10. The spinel-type nickel-manganese-lithium-containing composite oxide according to claim 9, wherein the median particle size by volume $D_v50$ of the spinel-type nickel-manganese-lithium-containing composite oxide is 6 μm-15 μm.

11. The spinel-type nickel-manganese-lithium-containing composite oxide according to claim 1, wherein at least part of surface of the spinel-type nickel-manganese-lithium-containing composite oxide further has a coating layer; and, wherein the coating layer comprises one or more of elements Al, Ti, B, Zr, and Si; and based on the mass of the spinel-type nickel-manganese-lithium-containing composite oxide, content of the one or more of the elements Al, Ti, B, Zr, and Si is 0.05 wt %-2 wt %.

12. The spinel-type nickel-manganese-lithium-containing composite oxide according to claim 1, wherein when the spinel-type nickel-manganese-lithium-containing composite oxide is charged/discharged at 0.05C-0.2C in a button half battery, a proportion of a charge capacity at 3.5 V-4.4 V in the first cycle to a charge capacity at 3.5 V-4.95 V in the first cycle is <3%.

13. A preparation method of spinel-type nickel-manganese-lithium-containing composite oxide, comprising the following steps:

S1: providing a body material $Li_xNi_yMn_zM_mO_{4-q}Q_q$, wherein M is selected from one or more of Ti, Zr, La, Co, Mg, Zn, Al, Mo, V, Cr, and B, Q is selected from one or two of F and Cl, $0.95 \le x \le 1.1$, $0.45 \le y \le 0.55$, $1.4 \le z \le 1.55$, $0 \le m \le 0.05$, and $0 \le q \le 1$;

S2: providing a P source and one or more sources selected from a W source, and an Sb source, wherein the one or more sources are denoted as a G source, and mixing the sources with the body material in step S1 to obtain a raw material mixture; and S3: performing high-temperature heat treatment on the raw material mixture obtained in step S2 to obtain the spinel-type nickel-manganese-lithium-containing composite oxide;

wherein based on mass of the spinel-type nickel-manganese-lithium-containing composite oxide, a doping content of the element P in the P source is denoted as k, $0.48 \text{ wt } \% \le k \le 3.05 \text{ wt } \%$, a doping content of the element G in the G source is denoted as g, $0.05 \text{ wt } \% \le g \le 0.31 \text{ wt } \%$, and the spinel-type nickel-manganese-lithium-containing composite oxide satisfies $2 \le k/g \le 20$.

14. The preparation method according to claim 13, wherein raw materials of the body material in step S1 comprise a lithium source, a nickel source, and a manganese source; and, wherein the lithium source is selected from one or more of oxide, hydroxide, carbonate, and nitrate that contain lithium;

the nickel source is selected from one or more of oxide, hydroxide, carbonate, nitrate, and sulfate that contain nickel;

the manganese source is selected from one or more of oxide, hydroxide, carbonate, nitrate, and sulfate that contain manganese; or the raw materials of the body material further comprise an additive that contains one or more of elements Ti, Zr, La, Co, Mg, Zn, Al, Mo, V, Cr, B, F, and Cl, and the additive is selected from one or more of the following: oxide, hydroxide, ammonium salt, and nitrate that contain one or more of elements Ti, Zr, La, Co, Mg, Zn, Al, Mo, V, Cr, B, F, and Cl.

15. The preparation method according to claim 13, wherein in step S2, the P source is selected from one or more of oxide, hydroxide, ammonium salt, and nitrate that contain P; and/or the G source is selected from one or more of the following: oxide, hydroxide, ammonium salt, and nitrate that contain one or more elements selected from elements W, and Sb.

16. The preparation method according to claim 13, wherein treatment conditions of the high-temperature heat treatment in step S3 are: heating the raw material mixture to 910-1050° C. at a temperature rise rate of 0.5-3° C./min in an air or oxygen atmosphere, and keeping the temperature for 5-30 hours.

17. The preparation method according to claim 13, wherein the preparation method further comprises the following step:

S4: performing ball milling on a resulting product of the high-temperature heat treatment in step S3.

18. The preparation method according to claim 13, wherein the preparation method further comprises the following step:

S5: performing annealing treatment on a resulting product of the high-temperature heat treatment in step S3 or performing annealing treatment on the product obtained through ball milling in step S4; and wherein conditions of the annealing treatment in step S5 are: heating the resulting product of the high-temperature heat treatment in step S3 or the product obtained through ball milling in step S4 to a temperature of 600-700° C., and keeping the temperature for 5-50 hours.

19. A secondary battery, comprising the spinel-type nickel-manganese-lithium-containing composite oxide according to claim 1.

20. An electric apparatus, comprising the secondary battery according to claim 19.

21. The spinel-type nickel-manganese-lithium-containing composite oxide according to claim 1, wherein the element G is W.

22. The spinel-type nickel-manganese-lithium-containing composite oxide according to claim 1, wherein the element G is Sb.

23. The spinel-type nickel-manganese-lithium-containing composite oxide according to claim 11, wherein based on the mass of the spinel-type nickel-manganese-lithium-containing composite oxide, a coating amount of the coating layer is 0.1 wt %-5 wt %.

24. The spinel-type nickel-manganese-lithium-containing composite oxide according to claim 11, wherein the coating layer is an oxide of the one or more elements selected from Al, Ti, B, Zr, and Si or a hydroxide of the one or more elements selected from Al, Ti, B, Zr, and Si.

* * * * *